(12) United States Patent
Zhu et al.

(10) Patent No.: US 11,522,595 B1
(45) Date of Patent: Dec. 6, 2022

(54) GRADIENT-BASED BEAM TRACKING MODE TRANSITION

(71) Applicant: QUALCOMM Incorporated, San Diego, CA (US)

(72) Inventors: Jun Zhu, San Diego, CA (US); Mihir Vijay Laghate, San Diego, CA (US); Yongle Wu, San Diego, CA (US); Raghu Narayan Challa, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/362,366

(22) Filed: Jun. 29, 2021

(51) Int. Cl.
*H04B 7/06* (2006.01)
*H04L 27/26* (2006.01)
*H04L 25/02* (2006.01)
*H04W 72/08* (2009.01)
*H04W 72/04* (2009.01)

(52) U.S. Cl.
CPC ....... *H04B 7/0639* (2013.01); *H04L 25/0202* (2013.01); *H04L 27/2613* (2013.01); *H04L 27/2662* (2013.01); *H04L 27/2675* (2013.01); *H04W 72/046* (2013.01); *H04W 72/085* (2013.01)

(58) Field of Classification Search
CPC .............. H04B 7/0639; H04L 25/0202; H04L 27/2613; H04L 27/2675; H04W 72/046; H04W 72/085
See application file for complete search history.

(56) References Cited

U.S. PATENT DOCUMENTS

2011/0032364 A1* 2/2011 Sheng .............. H04N 21/43074
348/E17.001

* cited by examiner

*Primary Examiner* — Jaison Joseph
(74) *Attorney, Agent, or Firm* — Procopio, Cory, Hargreaves & Savitch LLP

(57) ABSTRACT

The apparatus may be a UE. The UE may be configured to measure, over a time interval, a plurality of instances of a signal received from a serving device (e.g., a base station or serving UE). The UE may further be configured to adjust, based on at least two previously measured instances of the signal, a sampling rate associated with the signal received from the serving device. The UE may further be configured to maintain a particular number (e.g., 2-10) of previously measured instances of the signal, where adjusting the sampling rate is based on the maintained particular number of previously measured instances. The particular number of previously measured instances of the signal may be used to calculate a gradient of the measurements to identify a sampling rate associated with the calculated gradient.

30 Claims, 9 Drawing Sheets

GRADIENT-BASED BEAM TRACKING MODE TRANSITION

TECHNICAL FIELD

The present disclosure relates generally to communication systems, and more particularly, to a beam tracking capability as a user equipment (UE) transitions between stationary and mobile states.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or modem at a UE or the UE itself. The UE may be configured to measure, over a time interval, a plurality of instances of a signal received from a serving device (e.g., a base station or serving UE). The UE may further be configured to adjust, based on at least two previously measured instances of the signal, a sampling rate associated with the signal received from the serving device. In some aspects, the UE may further be configured to maintain a particular number of previously measured instances of the signal, where adjusting the sampling rate is based on the maintained particular number of previously measured instances.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
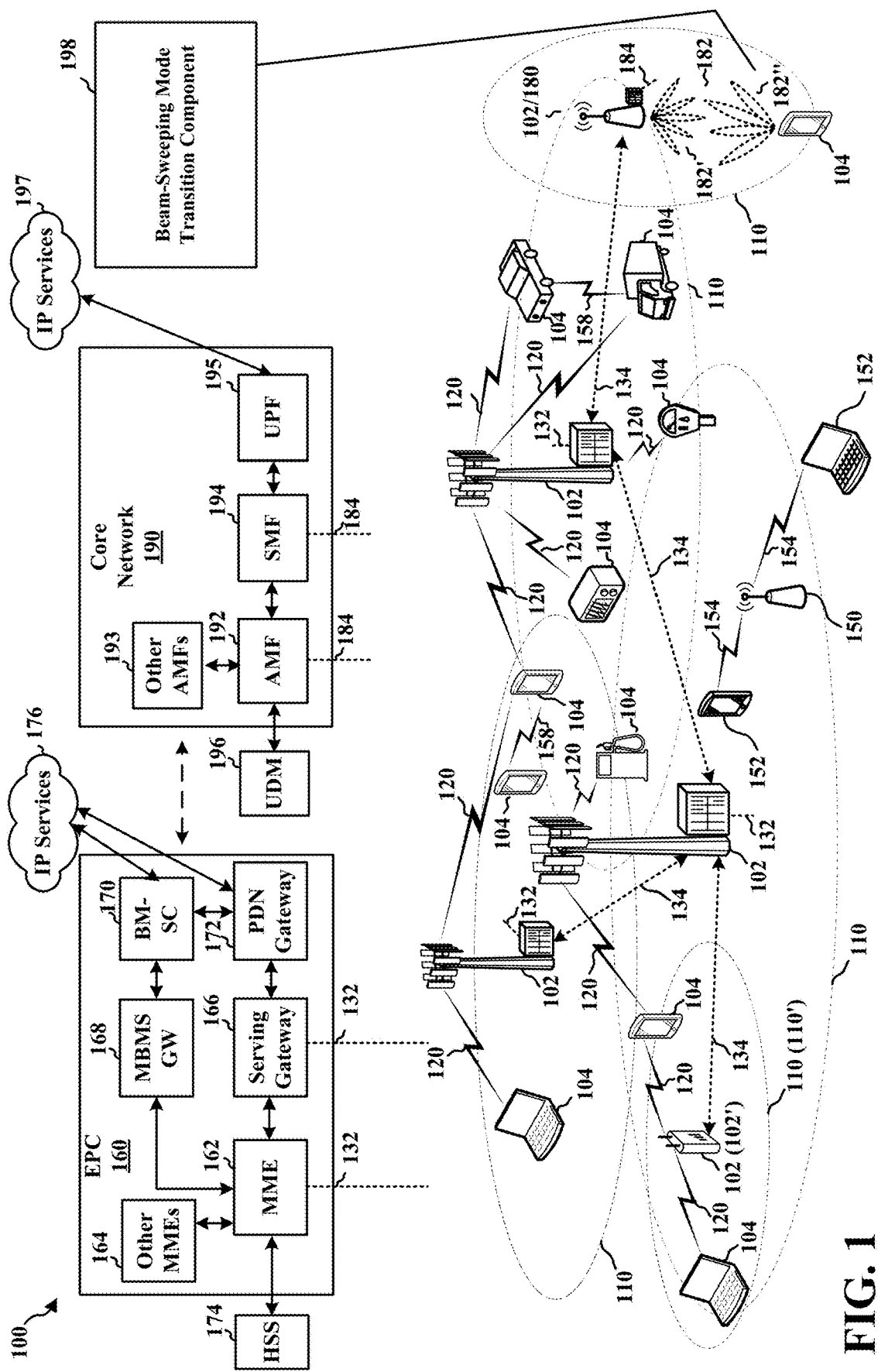
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

When stationary, a UE may remain in a lower-frequency beam-sweeping mode for power saving (e.g., monitoring/sampling synchronization signal block (SSBs) every 1 second). However, while in motion a UE may enter or remain in a higher-frequency beam-sweeping mode to improve beam tracking capability (e.g., monitoring/sampling every SSB). A UE may improve beam tracking capability by transitioning more quickly from a lower-frequency beam-sweeping mode to a higher-frequency beam-sweeping mode as it changes from being stationary to being in motion. Similarly, a UE may reduce power use for beam tracking by transitioning from a high-frequency beam-sweeping mode to a low-frequency beam-sweeping mode more quickly as the UE transitions from being in motion to a stationary state.

Aspects presented herein provide for a UE to more efficiently transition between beam-sweeping modes based on a gradient in reference signal measurements. For example, the measurements may include a reference signal received power (RSRP), a reference signal received quality (RSRQ), a signal-to-noise ratio (SINR) or other similar signal power and/or quality metric for reference signals received from a serving cell, base station beam(s), or UE beam(s). For example, the UE may measure, over a time interval, a plurality of instances of a signal received from a serving cell. The UE may further be configured to adjust, based on at least two previously measured instances of the signal, a sampling rate associated with the signal received from the serving device. In some aspects, the UE may further be configured to maintain a particular number (e.g., two or more) of previously measured instances of the signal, and may adjust the sampling rate based on the maintained particular number of previously measured instances.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam-sweeping mode transition component 198 that may be configured to measure, over a time interval, a plurality of instances of a signal received from a serving device and adjust, based on at least two previously measured instances of the signal, a sampling rate associated with the signal received from the serving device. Although the following description may be focused on 5G NR, the concepts described herein may be applicable to other similar areas, such as LTE, LTE-A, CDMA, GSM, and other wireless technologies.

Figure 2:
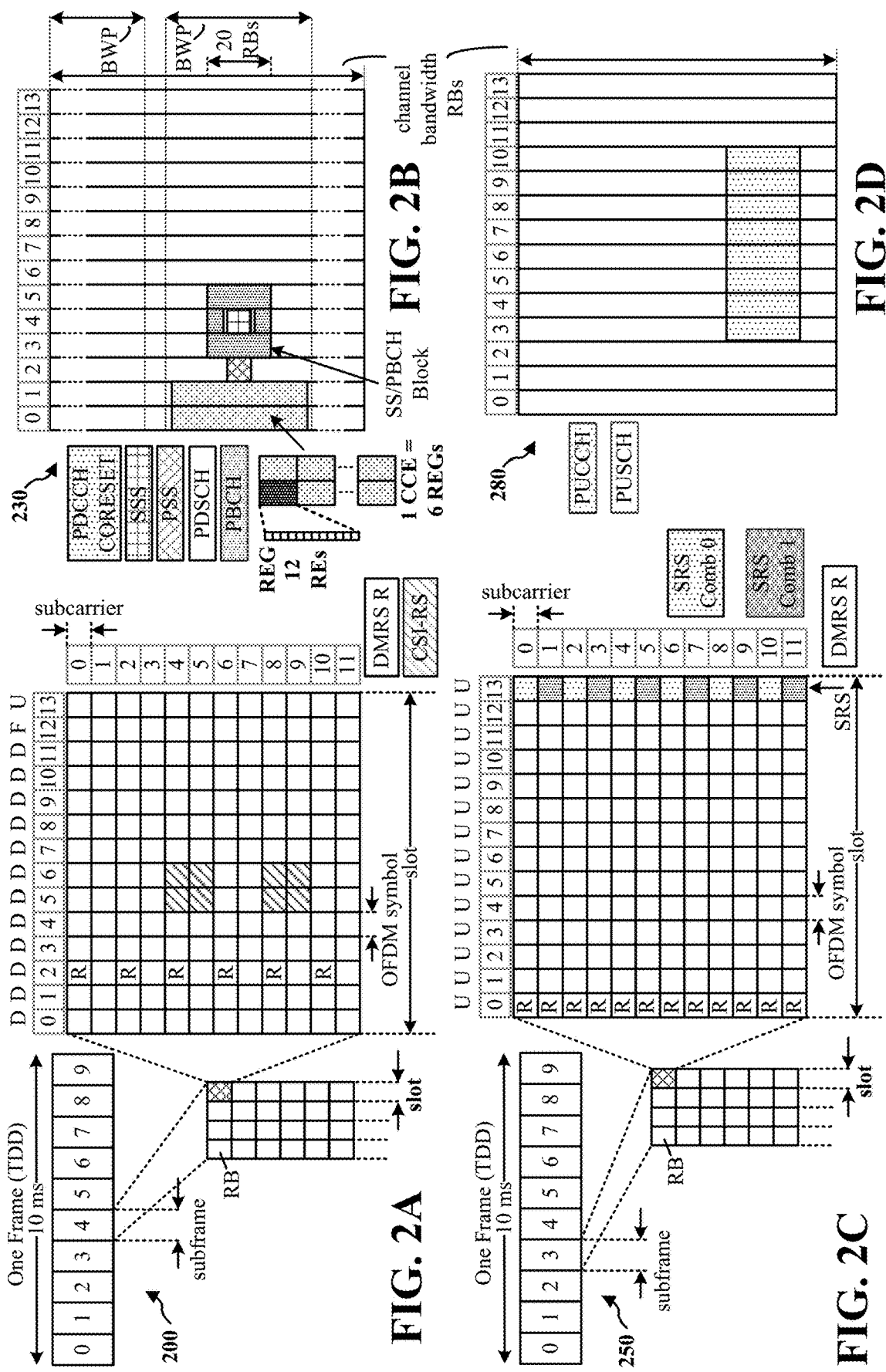
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
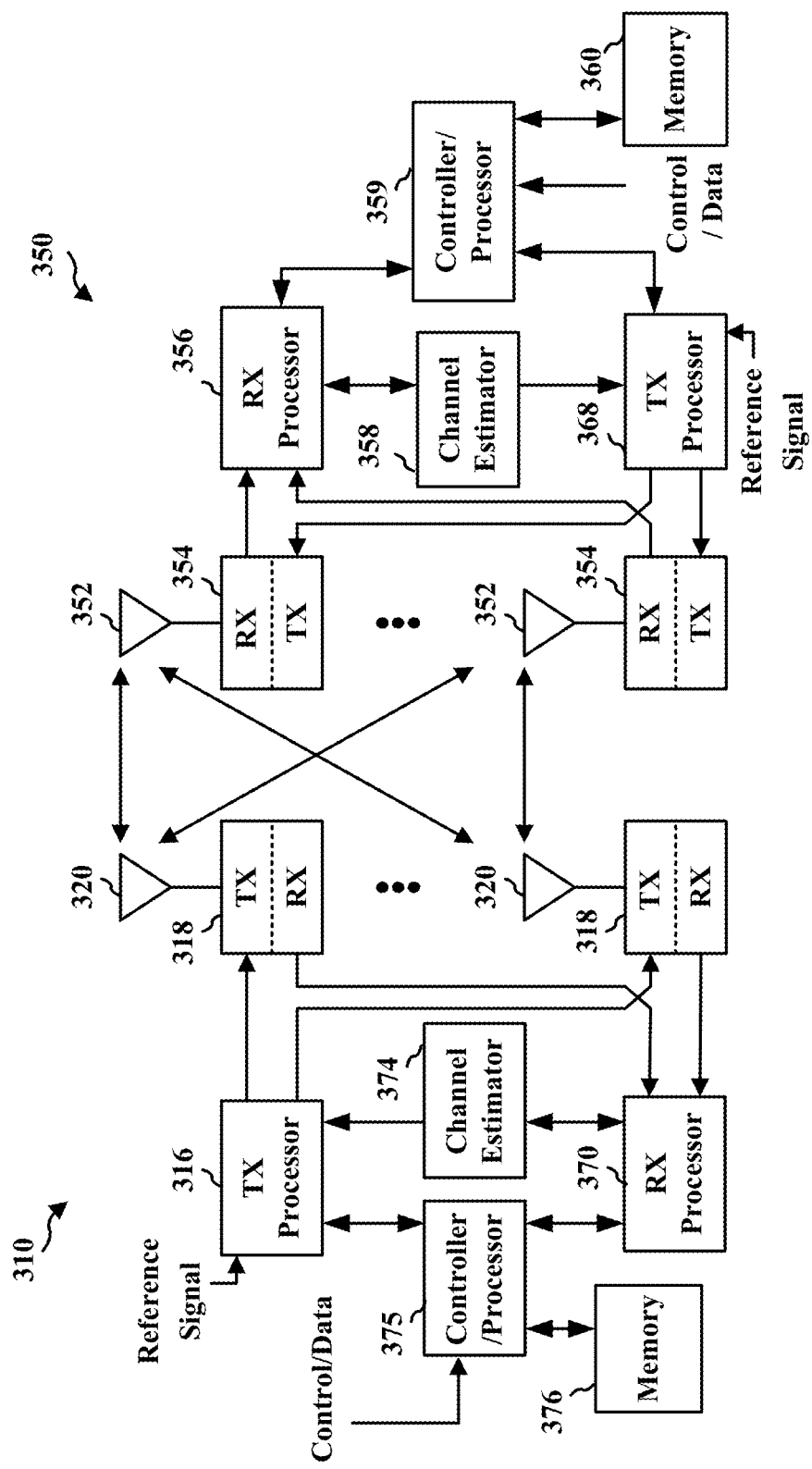
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

As described in connection with 182 in FIG. 1, a base station may transmit a beamformed signal to the UE in one or more transmit directions (e.g., 182'). The UE may receive the beamformed signal from the base station 180 in one or more receive directions (e.g., 182"). The UE may perform measurements of one or more downlink signals from the base station on different beams. For example, the UE may monitor for SSB transmissions from the base station in a beam sweep manner over multiple beams. The UE may monitor for the SSB transmissions from the base station according to a particular frequency or at a particular rate.

When stationary, a UE may remain in a lower-frequency beam-sweeping mode to save power (e.g., monitoring SSBs every 1 second). If the UE is stationary, the measurements are more likely to be similar over time. However, while in motion, a UE may enter or remain in a higher-frequency beam-sweeping mode (which may sometimes be referred to as a panic mode) to improve beam tracking capability (e.g., monitoring every SSB). As the UE moves relative to a base station, the beam quality for the various beams may change. Additionally, there may be a set of intermediate-frequency beam sweeping modes (e.g. a set of modes associated with different downsampling rates) that may be associated with different mobilities (e.g., velocities, relative velocities, or velocity components transverse to a beam direction). A UE may improve beam tracking capability by more quickly transitioning from a lower-frequency beam-sweeping mode to an intermediate- or higher-frequency beam-sweeping mode as the UE transitions from being stationary to being in motion. Similarly, a UE may reduce power consumption by more quickly transitioning from an intermediate- or higher-frequency beam-sweeping mode to a lower-frequency beam-sweeping mode as the UE transitions from being in motion to a stationary state.

In some aspects of wireless communication, a UE may transition from a lower-frequency beam-sweeping mode to an intermediate- or higher-frequency beam-sweeping mode based on a beam dwell time to infer mobility (e.g., a beam-switch-based transition). When using such a beam-switch-based transition, the time interval for detecting mobility may be unpredictable and, in some instances, larger than preferred. Additionally, a reliable mobility estimate may not be possible until a first beam switch and UL/DL data loss may occur if the beam switch only occurs after significant degradation of the serving beam. As presented herein, a gradient-based transition (e.g., downsampling rate adjustment) provides for predictable time intervals for detecting mobility (e.g., based on loop tracking performed to converge on a time tracking loop (TTL), frequency tracking loop (FTL), automatic gain control (AGC), etc.). The gradient-based transition may also provide a mobility estimate before a beam switch occurs.

Figure 4:
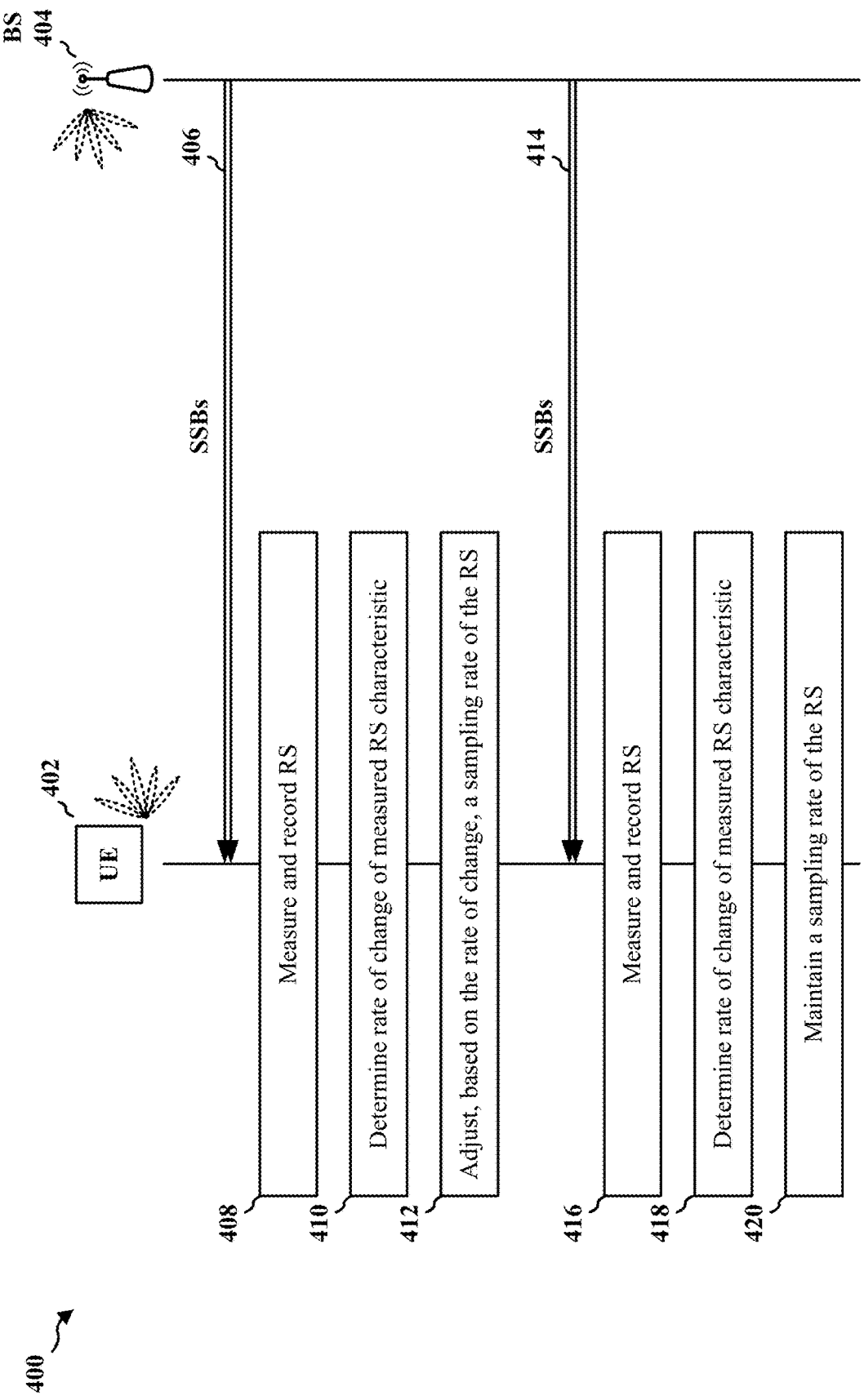
FIG. 4 is a call flow diagram illustrating a gradient-based beam-sweeping mode transition.

FIG. 4 is a call flow diagram 400 illustrating a gradient-based beam-sweeping mode transition. A base station 404 may transmit multiple reference signals (e.g., a SSB, a CSI-RS, etc.) 406 that may be received by a UE 402. The base station 404 may transmit the reference signals over different beams, e.g., in a beam sweep manner. The UE 402 may measure 408 the multiple reference signals with a first sampling rate, e.g., the UE 402 may measure a RSRP, a RSRQ, a SINR or other similar signal power and/or quality metric for the received reference signals 406 with the first sampling rate over one or more beams. The UE 402 may also record 408 the measurements for use in subsequent calculations. The UE may perform measurements for the serving cell, the serving base station beam, and/or the serving UE beam, for example.

Based on the measured and recorded 408 reference signals 406, the UE 402 may determine 410 a rate of change of a reference signal characteristic (e.g., a power or quality characteristic such as RSRP or RSRQ, respectively). The UE may compare the determined 410 rate of change to a set of threshold rates of change to determine an adjustment to a sampling rate of a reference signal for beam sweeping. For example, a set of threshold rates may define multiple intervals associated with different adjustments (e.g., different levels of downsampling or different sampling rates). Each interval, in some aspects, is associated with a particular range of mobilities (e.g., velocities, relative velocities, or velocity components transverse to a beam direction) for which a particular sampling rate is indicated. The UE may adjust 412 the sampling rate of the reference signals (e.g., reference signals 414) based on the determined 410 rate of change and the set of threshold rates of change. For example, the UE may determine that the rate of change of the measured RS characteristic is in an interval associated with a particular downsampling level or sampling rate and adjust the sampling rate based on the downsampling level or sampling rate associated with the interval.

The base station 404 may transmit a second set of reference signals 414. The UE 402 may measure the reference signal characteristic of the second set of reference signals 414 based on the adjusted sampling rate (a second sampling rate). As for the first reference signals, the UE 402 may also record 416 the measurements for use in subsequent calculations.

Based on the measured and recorded 416 reference signals 414, the UE 402 may determine 418 a rate of change of a reference signal characteristic (e.g., a power or quality characteristic such as RSRP or RSRQ, respectively). The UE may compare the determined 418 rate of change to the set of threshold rates of change to determine not to adjust a sampling rate of a reference signal for beam sweeping. For example, the UE may determine 418 that the rate of change of the measured RS characteristic is in a same interval as the rate of change determined 410 for the first set of reference signals 406. The interval may be associated with a particular sampling rate or with a downsampling level that would tend to reduce (or increase) sampling rates when the first sampling rate is a minimum (or maximum) sampling rate.

Figure 5:
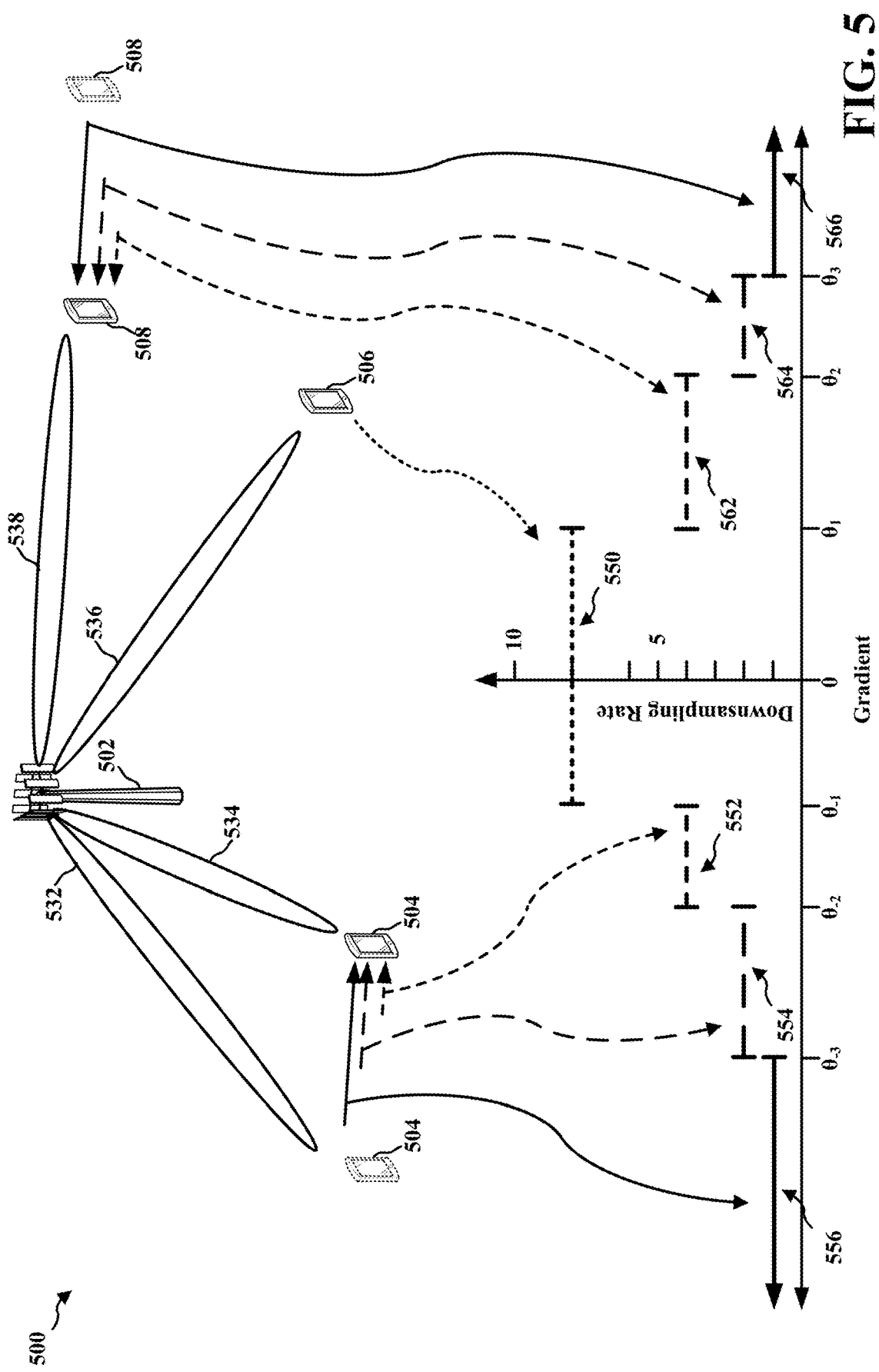
FIG. 5 is a diagram illustrating a base station in communication with a set of UEs.

FIG. 5 is a diagram 500 illustrating a base station 502 in communication with a set of UEs 504, 506, and 508 (e.g., as an example of a device capable of movement). Base station 502 may communicate with each device via one of beam 532, beam 534, beam 536, or beam 538 at a particular time. UE 506 may be relatively stationary and measure a rate of change (e.g., a gradient) of a reference signal associated with beam 536 that is in a central interval 550 from a first negative threshold ($\theta_{-1}$) to a first positive threshold ($\theta_1$). Based on the measured rate of change, the UE 506 may remain in, or transition to, a sampling rate associated with the gradient interval from $\theta_{-1}$ to $\theta_1$. In some aspects, the UE 506 may adjust a sampling rate based on the downsampling rate associated with the gradient interval 550 from $\theta_{-1}$ to $\theta_1$.

The UE 504 may move in a direction that is transverse to the propagation direction of beam 532 and/or 534. The UE 504 may be moving at a rate that generates a gradient of reference signals that is one of (1) in a first interval 552 between a first negative threshold ($\theta_{-1}$) and a second negative threshold ($\theta_{-2}$), (2) in a second interval 554 between a second negative threshold ($\theta_{-2}$) and a third negative threshold ($\theta_{-3}$), or (3) in a third interval 556 less than the third negative threshold ($\theta_{-3}$) and unbounded on the lower end. Based on the measured rate of change, the UE 508 may use a sampling rate associated with one of the gradient intervals 552, 554, or 556 (e.g., from $\theta_{-1}$ to $\theta_{-2}$, from $\theta_{-2}$ to $\theta_{-3}$, or below $\theta_{-3}$). In some aspects, the UE 504 may adjust a sampling rate based on the downsampling rate associated with one of the gradient intervals 552, 554, or 556.

The UE 508 may move in a direction that is parallel to the propagation direction of beam 538 and towards the serving base station 502. The UE 508 may move at a rate that generates a gradient of reference signals that is one of (1)) in a fourth interval 562 between a first positive threshold ($\theta_1$) and a second positive threshold ($\theta_2$), (2) in a fifth interval 564 between a second positive threshold ($\theta_2$) and a third positive threshold ($\theta_3$), or (3) in a sixth interval 566 greater than the third positive threshold ($\theta_3$) and unbounded on the upper end. Based on the measured rate of change, the UE 508 may use a sampling rate associated with one of the gradient intervals 562, 564, or 566 (e.g., from $\theta_1$ to $\theta_2$, from $\theta_2$ to $\theta_3$, or below $\theta_3$). In some aspects, the UE 504 may adjust a sampling rate based on the downsampling rate associated with one of the gradient intervals 562, 564, or 566.

Figure 6:
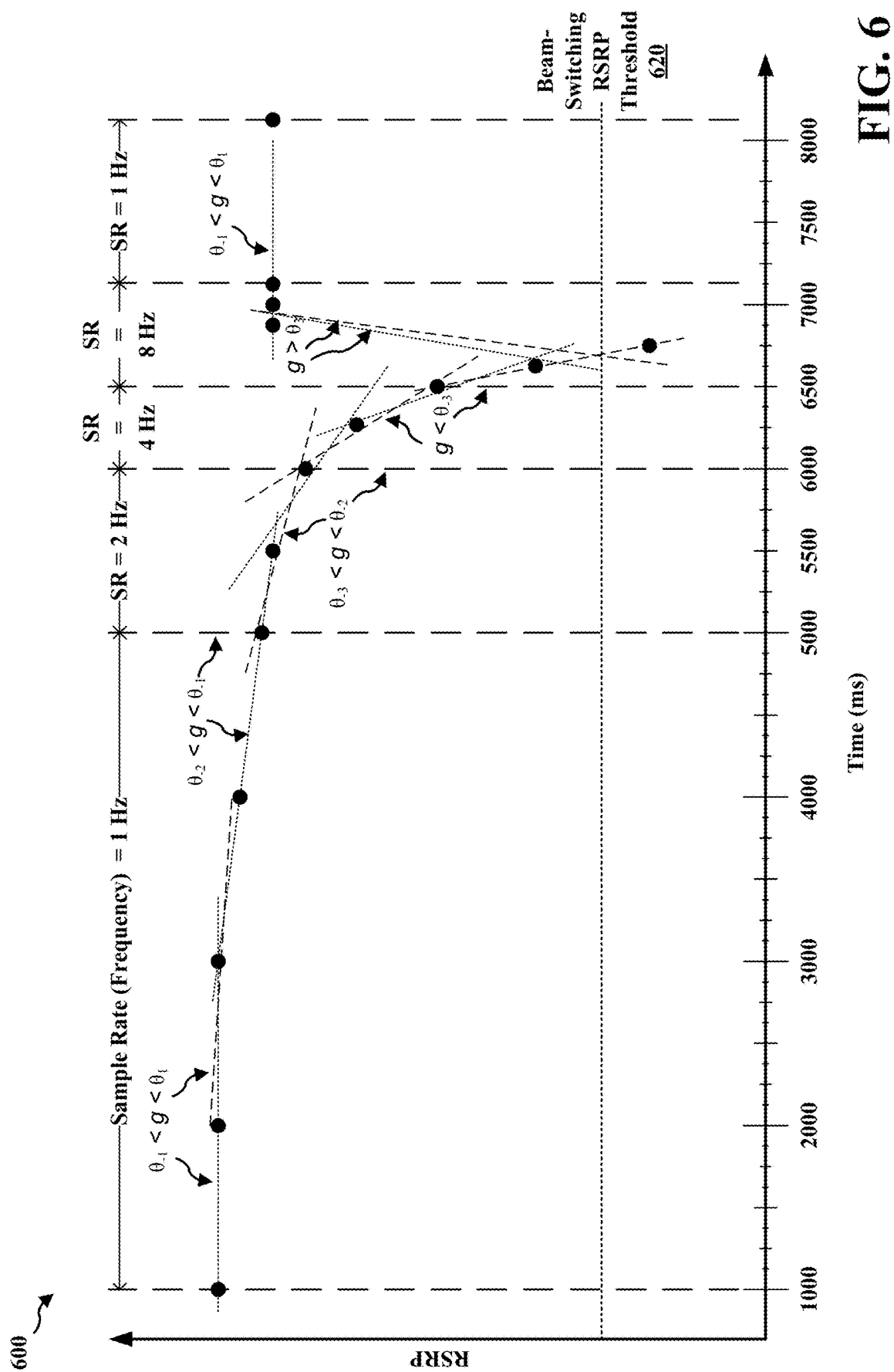
FIG. 6 is a diagram illustrating a set of measurements of a signal strength of a reference signal at a UE and a set of adjustments to a sampling rate of the reference signals at the UE based on a calculated rate of change of the measurements.

FIG. 6 is a diagram 600 illustrating a set of measurements of a signal strength (e.g., RSRP) of a reference signal at a UE and a set of adjustments to a sampling rate of the reference signals at the UE based on a calculated rate of change of the measurements (e.g., a gradient of the measurements or a slope of a fitted line). Diagram 600 illustrates a gradient "g" that is calculated based on three RSRP measurements as each measurement is made, but in some aspects may be based on a different number of measurements of instances of the reference signal. Diagram 600 illustrates that a UE may sample a reference signal at an initial sampling rate of one sample per second (e.g., a frequency of 1 Hz). Diagram 600 on a determined gradient "g" of the measured values of RSRP associated with a first set of measurements at 1000 ms, 2000 ms, 3000 ms, and 4000 ms is within a central interval from $\theta_{-1}$ to $\theta_1$ (e.g., the central interval 550 of FIG. 5).

At 5000 ms, diagram 600 illustrates that a (negative) gradient may be calculated that is in a first interval between $\theta_{-1}$ to $\theta_{-2}$ that is associated with a sampling rate of 2 Hz. Accordingly, the UE begins sampling the reference signal at 2 Hz. In some aspects, the gradient interval between $\theta_{-1}$ to $\theta_{-2}$ may be associated with a downsampling factor of 2 (e.g., doubling the sampling rate). The change in the RSRP measurements may be based on the UE beginning to move relative to a transmitter of the reference signal. As illustrated in diagram 600, the UE may continue to use the sampling rate of 2 Hz associated with the gradient interval between $\theta_{-1}$ to $\theta_{-2}$. In some aspects, the UE may increase and/or decrease the sampling rate based on a downsampling level (e.g., factor) associated with the gradient interval.

From 5000 ms to 6000 ms the UE may sample the reference signal at 2 Hz while a calculated gradient remains in the first interval between $\theta_{-1}$ to $\theta_{-2}$. At 6000 ms, the UE may calculate a gradient that is in a second interval between $\theta_{-2}$ to $\theta_{-3}$ that is associated with a sampling rate of 4 Hz. Accordingly, the UE begins sampling the reference signal at 4 Hz from 6000 ms to 6500 ms, while the calculated gradient is in the second interval between $\theta_{-2}$ to $\theta_{-3}$.

At 6500 ms the UE may calculate a gradient that is in a third interval below $\theta_{-3}$ that is associated with a sampling rate of 8 Hz. Accordingly, the UE begins sampling the reference signal at 8 Hz at 6500 ms. As the measured reference signal power and/or quality (e.g., RSRP) falls below a threshold (e.g., a beam-switching RSRP threshold 620), the UE may select a new beam with a higher measured power and/or quality. The calculated gradient at 6875 ms and 7000 ms may be above a third positive threshold rate-of-change (gradient) value that is associated with a sampling rate of 8 Hz and the UE may continue to sample the reference signal at 8 Hz.

Finally, a UE may calculate, at 7125 ms, a gradient that is within a central interval from $\theta_{-1}$ to $\theta_1$ (e.g., the central interval 550 of FIG. 5) associated with a sampling rate of 1 Hz. Accordingly, the UE begins sampling the reference signal at 1 Hz. In some aspects, the measured reference signal strength and/or quality may remain relatively constant because the UE is relatively stationary or slowly-moving relative to the transmitter (e.g., a base station) of the reference signal.

Figure 7:
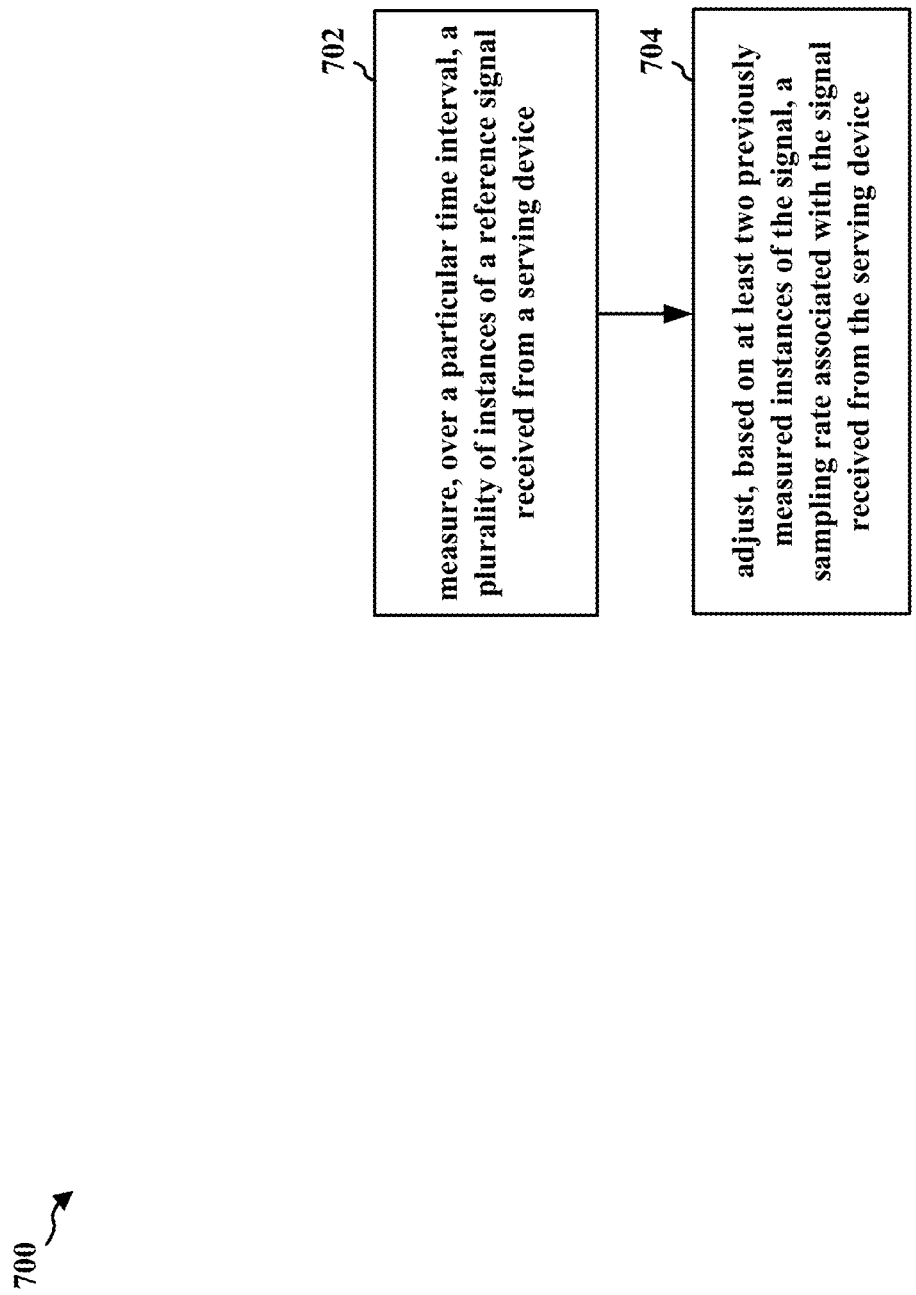
FIG. 7 is a flowchart of a method of wireless communication.

FIG. 7 is a flowchart 700 of a method of wireless communication. The method may be performed by a UE (e.g., the UE 104, 402; the apparatus 902). At 702, the UE may measure, over a particular time interval, multiple instances of a reference signal. The reference signals may be received from a serving device. The serving device may be one of a serving cell, a base station, or a serving UE. The received reference signal, in some aspects, may be a reference signal associated with a particular beam in a plurality of beams. The multiple instances of the reference signal may be non-sequential instances of the reference signal separated by a period based on a current sampling rate (e.g. a downsampling rate).

The measurements, in some aspects, may be of a power or quality of the reference signal. For example, the UE may measure the RSRP, the RSRQ, the SINR, or another similar signal power and/or quality metric of the received reference signals. In some aspects, the UE may maintain a particular number (e.g., 2-10) of previous measurements (e.g., RSRP, RSRQ, etc.) associated with measured instances of the reference signal. The measured instances of the reference for which measurements are maintained, in some aspects, may be the particular number (e.g., 2-10) immediately-previous measured reference signal instances. For example, referring to FIG. 4, the UE 402 may measure and record 408 or 416 a set of reference signals (e.g., reference signal instances) 406 or 414 transmitted by a base station 404. The received reference signal may be associated with a SSB. For example, 702 may be performed by RS measurement component 940.

At 704, the UE may adjust, based on a gradient for at least two previously measured instances of the reference signal, a sampling rate associated with the reference signal. Adjusting, at 704, the sampling rate associated with the reference signal includes one of reducing the sampling rate if the gradient is below a threshold or increasing the sampling rate if the gradient is above a threshold. In some aspects, adjusting the sampling rate is based on the particular number of previous measurements maintained by the UE. For example, 704 may be performed by sampling rate adjustment component 944.

Adjusting, at 704, the sampling rate, in some aspects, includes calculating a rate of change of measurements over the time interval (e.g., a measurement time interval) and configuring the sampling rate associated with the reference signal based on the determined rate of change. The configured sampling rate, may be the same as, or different than, a sampling rate used for an immediately previous measurement interval based on the determined rate of change. For example, calculating the rate of change of measurements over the particular time interval as part of 704 may be performed by RS measurement gradient calculation component 942.

The UE may configure a first set of positive threshold rate-of-change values and a second set of negative threshold rate-of-change values and each of a plurality of intervals may be associated with at least one of a particular reference-signal-sampling rate or a particular downsampling factor, where each interval is an interval between adjacent threshold rate of change values. Adjusting the sampling rate based on the determined rate of change may include determining an interval containing the calculated rate of change and configuring the sampling rate associated with the reference signal based on one of the particular reference-signal-sampling rate associated with the determined interval or the particular downsampling factor associated with the determined interval. For example, referring to FIGS. 4 and 5, the UE 402, 504, 506, or 508 may determine 410 or 418 a rate of change of the measured instances of the reference signals 406 or 414 and configure (e.g., adjust 412 or maintain 420) a sampling rate (e.g., a downsampling rate) based on the particular reference-signal-sampling rate (or downsampling factor) associated with an interval 550, 552, 554, 556, 562, 564, or 566 including the determined 410 or 418 rate of change. For example, 704 may be performed by sampling rate adjustment component 944.

Figure 8:
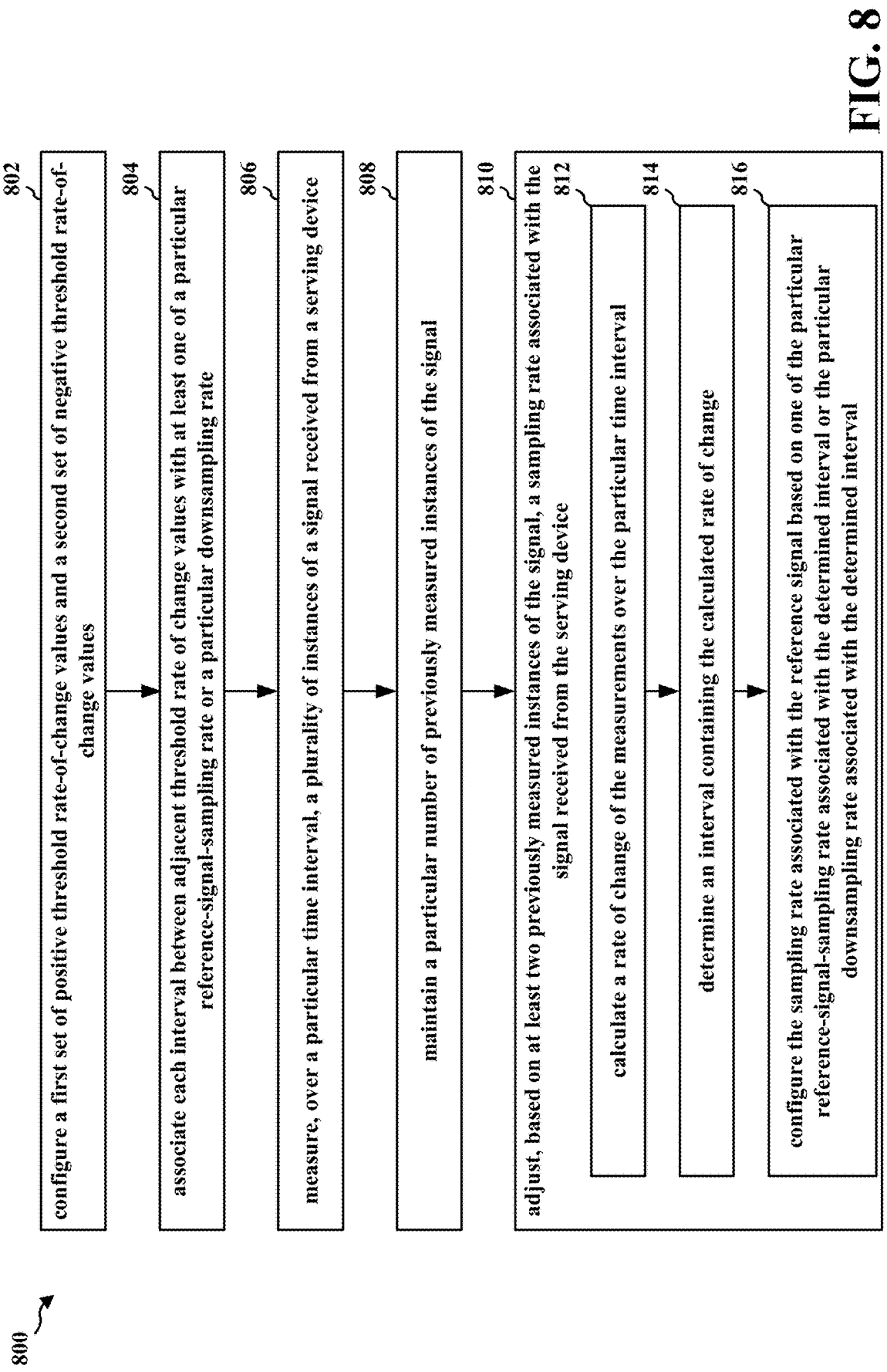
FIG. 8 is a flowchart of a method of wireless communication.

FIG. 8 is a flowchart 800 of a method of wireless communication. The method may be performed by a UE (e.g., the UE 104, 402; the apparatus 902). At 802, the UE may configure a first set of positive threshold rate-of-change values and a second set of negative threshold rate-of-change values. The positive and negative threshold rate-of-change values may be of different magnitudes. The first set of positive threshold rate-of-change values may include the same number of values as, or a different number of values from, the second set of negative threshold rate-of-change values. In some aspects, the different value magnitudes and/or the different number of values may be based on the UE being more sensitive to negative rate-of-change values than it is to positive rate-of-change values. For example, referring to FIG. 5, a UE 504, 506, or 508, may configure a set of positive threshold rate-of-change values $\theta_1$, $\theta_2$, and $\theta_3$ and a set of negative threshold rate-of-change values $\theta_{-1}$, $\theta_{-2}$, and $\theta_{-3}$.). For example, 802 may be performed by sampling rate adjustment component 944.

The configured sets of positive and negative threshold rate-of-change values may define a set of intervals between adjacent threshold rate of change values. For example, referring to FIG. 5, a set of intervals 550, 552, 554, 562, and 564 are defined by the set of positive threshold rate-of-change values $\theta_1$, $\theta_2$, and $\theta_3$ and the set of negative threshold rate-of-change values $\theta_{-1}$, $\theta_{-2}$, and $\theta_{-3}$. The positive and/or negative threshold rate-of-change values with the greatest magnitude may also be used to define unbounded intervals above and/or below, respectively, the positive and/or negative threshold rate-of-change values with the greatest magnitude. For example, referring to FIG. 5, a set of intervals 556 and 566 are defined by the positive threshold rate-of-change value $\theta_3$ and the negative threshold rate-of-change values $\theta_{-3}$. The sets of positive and negative threshold rate-of-change values may be received in configuration information (e.g., an RRC message, pre-configuration information, etc.).

At 804, the UE may associate each of a plurality of intervals with at least one of a particular reference-signal-sampling rate (e.g., a downsampling rate) or a particular downsampling factor, where each interval may be an interval between adjacent threshold rate of change values. For example, referring to FIG. 5, a downsampling rate of "1" may be associated with intervals 556 and 566, a downsampling rate of "2" may be associated with intervals 554 and 564, a downsampling rate of "4" may be associated with intervals 552 and 562, and a downsampling rate of "8" may be associated with interval 550. For example, 804 may be performed by sampling rate adjustment component 944.

At 806, the UE may measure, over a particular time interval, multiple instances of a reference signal received from a serving device. The serving device may be one of a base station or a serving UE. The received reference signal, in some aspects, may be a reference signal associated with a particular beam in a plurality of beams. The multiple instances of the reference signal may be non-sequential instances of the reference signal separated by a period based on a current sampling rate (e.g. a downsampling rate). The measurements, in some aspects, may be of a power or quality of the reference signal. For example, the UE may measure the RSRP, the RSRQ, the SINR, or another similar signal power and/or quality metric of the received reference signals. The received reference signal may be associated with a SSB. For example, referring to FIG. 4, the UE 402 may measure 408 or 416 a set of reference signals (e.g., reference signal instances) 406 or 414 transmitted by a base station 404. For example, 806 may be performed by RS measurement component 940.

At 808, the UE may maintain a particular number (e.g., 2-10) of previous measurements (e.g., RSRP, RSRQ, etc.) associated with measured instances of the reference signal. The measured instances of the reference for which measurements are maintained, in some aspects, may be the particular number (e.g., 2-10) immediately-previous measured reference signal instances. For example, referring to FIG. 4, the UE 402 may record 408 or 416 measurements of a set of reference signals (e.g., reference signal instances) 406 or 414 transmitted by a base station 404. For example, 808 may be performed by RS measurement component 940.

At 810, the UE may adjust, based on at least two previously measured instances of the reference signal, a sampling rate associated with the reference signal received from the serving device. In some aspects, adjusting the sampling rate is based on the maintained particular number of previous measurements. Adjusting, at 810, the sampling rate, in some aspects, includes calculating, at 812, a rate of change of the measurements over the particular time interval (e.g., a measurement time interval). In some aspects, calculating, at 812, the rate of change (e.g., a gradient "g") of the measurements over the particular time interval may be based on a least square fit. For example, the gradient "g" may be calculated using the equation:

$$\begin{pmatrix} g \\ c \end{pmatrix} = \left( \begin{pmatrix} (N-1)X & 1 \\ \vdots & \vdots \\ 0 & 1 \end{pmatrix}^T \begin{pmatrix} (N-1)X & 1 \\ \vdots & \vdots \\ 0 & 1 \end{pmatrix} \right)^{-1} \begin{pmatrix} (N-1)X & 1 \\ \vdots & \vdots \\ 0 & 1 \end{pmatrix}^T \begin{pmatrix} y_{N-1} \\ \vdots \\ y_0 \end{pmatrix}$$

where c is a constant (e.g., a y-intercept of the least square fit) that is not used in some aspects, X is a loop update rate, and N is a number of samples (e.g., measurements $y_0$ to $y_{N-1}$) on which the least square fit is based. For example, referring to FIGS. 4 and 5, the UE 402, 504, 506, or 508 may calculate (or determine 410) a rate of change of the measurements made over a previous measurement interval. For example, 810 may be performed by sampling rate adjustment component 944 and 812 may be performed by RS measurement gradient calculation component 942.

At 814, the UE may determine an interval containing the calculated rate of change of the measurements over the particular time interval. In some aspects, determining the interval containing the calculated rate of change may include comparing the calculated rate of change to the configured, at 802, threshold rate-of-change values. For example, referring to FIG. 5, the UE 504, 506, or 508 may determine that a rate of change of the measurement is contained in one of intervals 550, 552, 554, 556, 562, 564, or 566. For example, 814 may be performed by sampling rate adjustment component 944.

Finally, at 816, the UE may configure the sampling rate associated with the reference signal based on one of the particular reference-signal-sampling rate associated with the determined, at 814, interval or the particular downsampling rate associated with the determined interval. For example, referring to FIGS. 4 and 5, the UE 402, 504, 506, or 508 may configure (e.g., adjust 412 or maintain 420) a sampling rate based on a particular reference-signal-sampling (or downsampling) rate associated with an interval 550, 552, 554, 556, 562, 564, or 566 determined (at 814) to include the rate of change of the measurements over the particular time interval calculated at 812. The configured (e.g., adjusted 412 or maintained 420) sampling rate, may be the same as, or different than, a sampling rate used for an immediately previous measurement interval based on the determined rate of change. For example, 816 may be performed by sampling rate adjustment component 944.

Figure 9:
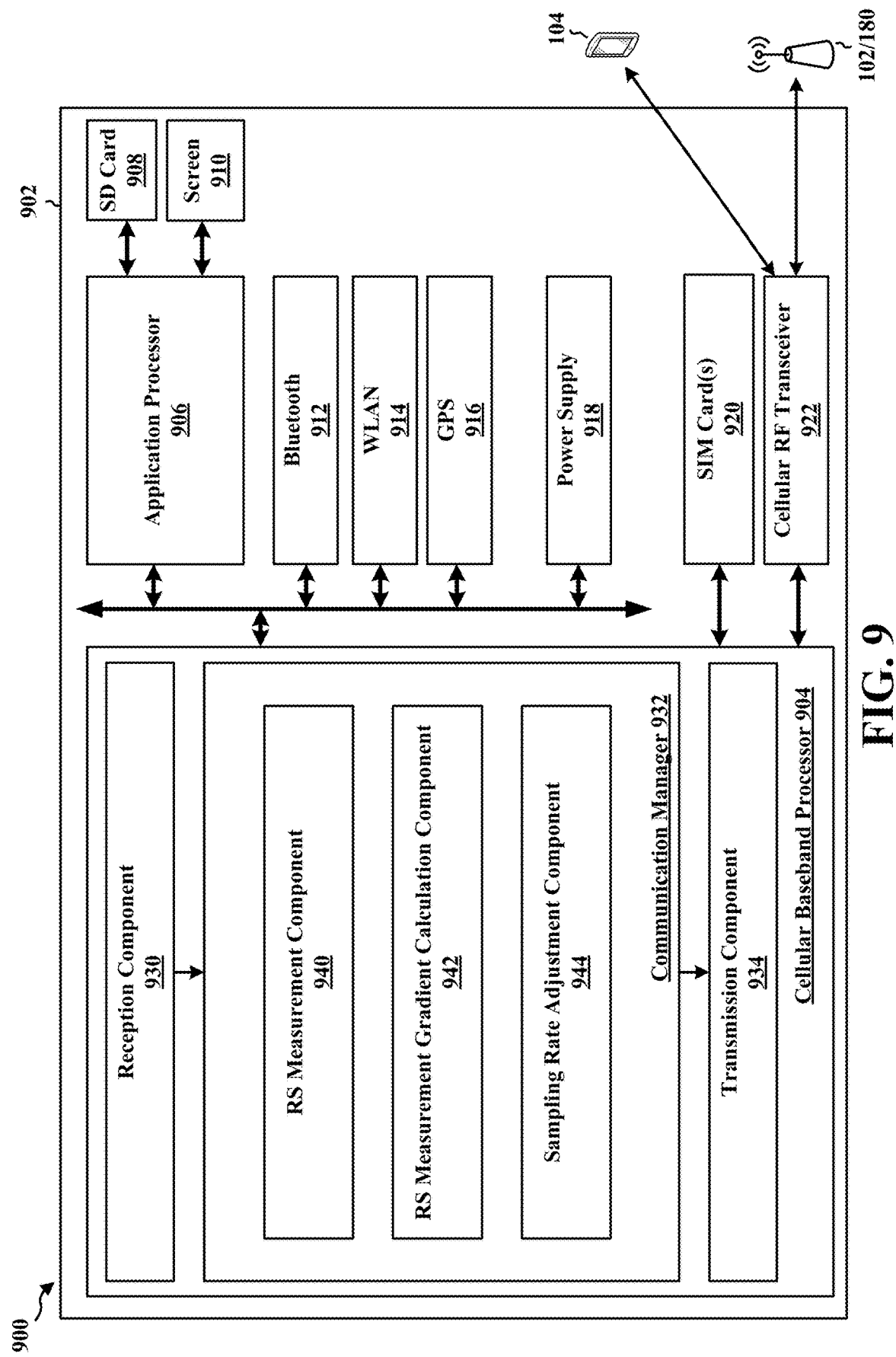
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a reference signal (RS) measurement component 940 that may be configured to measure, over a particular time interval, multiple instances of a reference signal received from a serving device and maintain a particular number (e.g., 2-10) of previous measurements (e.g., RSRP, RSRQ, etc.) associated with measured instances of the reference signal, e.g., as described in connection with 702, 806, and 808 of FIGS. 7 and 8. The communication manager 932 further includes a RS measurement gradient calculation component 942 that receives input in the form of measurements of the reference signal power and/or quality over a particular time interval from the RS measurement component 940 and is configured to calculate a rate of change of the measurements over the particular time interval, e.g., as described in connection with 704 and 812 of FIGS. 7 and 8. The communication manager 932 further includes a sampling rate adjustment component 944 that receives input in the form of a calculated rate of change of the reference signal power and/or quality measurement from the RS measurement component 940 and is configured to adjust, based on at least two previously measured instances of the reference signal, a sampling rate associated with the reference signal received from the serving device, e.g., as described in connection with 704 and 810 of FIGS. 7 and 8. The sampling rate adjustment component 944 may also receive input in the form of a first set of positive threshold rate-of-change values and a second set of negative threshold rate-of-change values from a serving device or via pre-configuration may be configured to configure a first set of positive threshold rate-of-change values and a second set of negative threshold rate-of-change values and associate each of a plurality of intervals with at least one of a particular reference-signal-sampling rate or a particular downsampling factor, where each interval may be an interval between adjacent threshold rate of change values, e.g., as described in connection with 802 and 804 of FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for measuring, over a particular time interval, a plurality of instances of a reference signal received from a serving device. The cellular baseband processor 904, may further include means for adjusting, based on at least two previously measured instances of the reference signal, a sampling rate associated with the reference signal received from the serving device. The cellular baseband processor 904, may further include means for maintaining a particular number of previous measurements associated with measured instances of the reference signal, where adjusting the sampling rate is based on the maintained particular number of previous measurements.

The cellular baseband processor 904, may further include means for configuring a first set of positive threshold rate-of-change values and a second set of negative threshold rate-of-change values. The cellular baseband processor 904, may further include means for associating each of a plurality of intervals with at least one of a particular reference-signal-sampling rate or a particular downsampling factor, each interval comprising an interval between adjacent threshold rate of change values. The cellular baseband processor 904, may further include means for calculating a rate of change of the measurements over the particular time interval. The cellular baseband processor 904, may further include means for determining an interval in the plurality of intervals containing the calculated rate of change. The cellular baseband processor 904, may further include means for configuring the sampling rate associated with the reference signal based on one of the particular reference-signal-sampling rate associated with the determined interval or the particular downsampling factor associated with the determined interval. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

When stationary, a UE may remain in a low-frequency beam-sweeping mode (sometimes referred to as excellent mode) for power saving (e.g., monitoring SSBs every 1 second). However, while in motion a UE may enter or remain in a high-frequency beam-sweeping mode (sometimes referred to as panic mode) to improve beam tracking capability (e.g., monitoring every SSB). Additionally, there may be a set of intermediate-frequency beam sweeping modes (e.g. a set of modes associated with different downsampling rates) that may be associated with different mobilities (e.g., velocities, relative velocities, or velocity components transverse to a beam direction). A UE may benefit from quickly transitioning from a low-frequency beam-sweeping mode to an intermediate- or high-frequency beam-sweeping mode as it transitions from being stationary to being in motion to improve beam tracking capability. Similarly, a UE may benefit from quickly transitioning from an intermediate- or high-frequency beam-sweeping mode to a low-frequency beam-sweeping mode as it transitions from being in motion to being stationary to avoid wasting unnecessary power for beam tracking.

In some aspects of wireless communication, e.g., 5G NR, a UE may transition from a low-frequency beam-sweeping mode to an intermediate- or high-frequency beam-sweeping mode based on a beam dwell time to infer mobility (e.g., a beam-switch-based transition). When using such a beam-switch-based transition, the time interval for detecting mobility may be unpredictable and, in some instances, larger than preferred as it waits for a detected signal to fall below a threshold power and/or quality before increasing a sampling rate. Additionally, a reliable mobility estimate may not be possible until a first beam switch, and UL/DL data loss may occur if the beam switch only occurs after significant degradation of the serving beam. In some aspects, a gradient-based transition (e.g., downsampling rate adjustment) discussed above allows for predictable time intervals for detecting mobility (e.g., based on loop tracking performed to converge on TTL, FTL, AGC, etc.). The gradient-based transition may also provide a mobility estimate before a first beam switch occurs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to measure, over a time interval, a plurality of instances of a reference signal and adjust, based on a gradient for at least two previously measured instances of the reference signal, a sampling rate associated with the reference signal.

Aspect 2 is the apparatus of aspect 1, where the reference signal is a reference signal for a serving cell of the UE.

Aspect 3 is the apparatus of aspect 1, where the reference signal is received from a base station serving the UE.

Aspect 4 is the apparatus of aspect 1, where the reference signal is received from another UE serving the UE.

Aspect 5 is the apparatus of any of aspects 1 to 4, where the reference signal is associated with a particular beam in a plurality of beams.

Aspect 6 is the apparatus of any of aspects 1 to 5, the at least one processor being further configured to maintain a particular number of previously measured instances of the reference signal, where adjusting the sampling rate is based on the particular number of previously measured instances of the reference signal maintained by the UE.

Aspect 7 is the apparatus of aspect 6, where the previously measured reference signal instances include immediately-previous measured reference signal instances.

Aspect 8 is the apparatus of any of aspects 1 to 7, the at least one processor being further configured to configure a first set of positive threshold rate-of-change values and a second set of negative threshold rate-of-change values, and associate each interval between adjacent threshold rate of change values with a particular reference-signal-sampling rate, where adjusting the sampling rate based on the gradient for at least two previously measured instances of the reference signal includes calculating the gradient for measurements over the time interval, determining an interval containing the calculated gradient, and configuring the sampling rate associated with the reference signal based on the particular reference-signal-sampling rate associated with the interval.

Aspect 9 is the apparatus of aspect 8, where the gradient for the measurements is based on a motion of the UE.

Aspect 10 is the apparatus of any of aspects 1 to 9, where the reference signal is associated with a SSB.

Aspect 11 is the apparatus of any of aspects 1 to 10, where adjusting the sampling rate associated with the reference signal includes reducing the sampling rate based on a magnitude of the gradient being below a threshold.

Aspect 12 is the apparatus of any of aspects 1 to 10, where adjusting the sampling rate associated with the reference signal includes increasing the sampling rate based on a magnitude of the gradient being above a threshold.

Aspect 13 is the apparatus of any of aspects 1 to 12, further including comprising a transceiver coupled to the at least one processor.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

What is claimed is:

1. An apparatus for wireless communication at a user equipment (UE), comprising:
    a memory; and
    at least one processor coupled to the memory and configured to:
        measure, over a time interval, a plurality of instances of a reference signal; and
        adjust, based on a gradient for at least two previously measured instances of the reference signal, a sampling rate associated with the reference signal.

2. The apparatus of claim 1, wherein the reference signal is for a serving cell of the UE.

3. The apparatus of claim 1, wherein the reference signal is received from a base station serving the UE.

4. The apparatus of claim 1, wherein the reference signal is received from another UE serving the UE.

5. The apparatus of claim 1, wherein the reference signal is associated with a particular beam in a plurality of beams.

6. The apparatus of claim 1, the at least one processor being further configured to maintain a particular number of previously measured instances of the reference signal, wherein adjusting the sampling rate is based on the particular number of previously measured instances of the reference signal maintained by the UE.

7. The apparatus of claim 6, wherein the previously measured reference signal instances comprise immediately-previous measured reference signal instances.

8. The apparatus of claim 1, the at least one processor being further configured to:
    configure a first set of positive threshold rate-of-change values and a second set of negative threshold rate-of-change values; and
    associate each interval between adjacent threshold rate of change values with a particular reference-signal-sampling rate,
    wherein adjusting the sampling rate based on the gradient for the at least two previously measured instances of the reference signal comprises:
        calculating the gradient for measurements over the time interval;
        determining an interval containing the calculated gradient; and
        configuring the sampling rate associated with the reference signal based on the particular reference-signal-sampling rate associated with the interval.

9. The apparatus of claim 8, wherein the gradient for the measurements is based on a motion of the UE.

10. The apparatus of claim 1, wherein the reference signal is associated with a synchronization signal block.

11. The apparatus of claim 1, wherein adjusting the sampling rate associated with the reference signal includes reducing the sampling rate based on a magnitude of the gradient being below a threshold.

12. The apparatus of claim 1, wherein adjusting the sampling rate associated with the reference signal includes increasing the sampling rate based on a magnitude of the gradient being above a threshold.

13. The apparatus of claim 1, further comprising a transceiver coupled to the at least one processor.

14. A method of wireless communication at a user equipment (UE), comprising:
    measuring, over a time interval, a plurality of instances of a reference signal; and
    adjusting, based on a gradient for at least two previously measured instances of the reference signal, a sampling rate associated with the reference signal.

15. The method of claim 14, wherein the reference signal is for a serving cell of the UE.

16. The method of claim 14, wherein the reference signal is received from at least one of a base station serving the UE or another UE serving the UE.

17. The method of claim 14, wherein the reference signal is associated with a particular beam in a plurality of beams.

18. The method of claim 14, further comprising maintaining a particular number of previously measured instances of the reference signal, wherein adjusting the sampling rate is based on the particular number of previously measured instances of the reference signal maintained by the UE.

19. The method of claim 14, further comprising:
    configuring a first set of positive threshold rate-of-change values and a second set of negative threshold rate-of-change values; and
    associating each interval between adjacent threshold rate of change values with a particular reference-signal-sampling rate,
    wherein adjusting the sampling rate based on the gradient for the at least two previously measured instances of the reference signal comprises:
        calculating the gradient for measurements over the time interval;
        determining an interval containing the calculated gradient; and
        configuring the sampling rate associated with the reference signal based on the particular reference-signal-sampling rate associated with the interval.

20. The method of claim 19, wherein the gradient for the measurements is based on a motion of the UE.

21. The method of claim 14, wherein the reference signal is associated with a synchronization signal block.

22. An apparatus for wireless communication at a user equipment (UE), comprising:
means for measuring, over a time interval, a plurality of instances of a reference signal; and
means for adjusting, based on a gradient for at least two previously measured instances of the reference signal, a sampling rate associated with the reference signal.

23. The apparatus of claim 22, wherein the reference signal is for a serving cell of the UE.

24. The apparatus of claim 22, wherein the reference signal is received from at least one of a base station serving the UE or another UE serving the UE.

25. The apparatus of claim 22, wherein the reference signal is associated with a particular beam in a plurality of beams.

26. The apparatus of claim 22, further comprising means for maintaining a particular number of previously measured instances of the reference signal, wherein adjusting the sampling rate is based on the particular number of previously measured instances of the reference signal maintained by the UE.

27. The apparatus of claim 22, further comprising:
means for configuring a first set of positive threshold rate-of-change values and a second set of negative threshold rate-of-change values; and
means for associating each interval between adjacent threshold rate of change values with a particular reference-signal-sampling rate,
wherein the means for adjusting the sampling rate based on the gradient for the at least two previously measured instances of the reference signal comprises:
means for calculating the gradient for measurements over the time interval;
means for determining an interval containing the calculated gradient; and
means for configuring the sampling rate associated with the reference signal based on the particular reference-signal-sampling rate associated with the interval.

28. The apparatus of claim 22, wherein the reference signal is associated with a synchronization signal block.

29. A non-transitory computer-readable medium storing computer executable code at a user equipment (UE), the computer executable code when executed by a processor causes the processor to:
measure, over a time interval, a plurality of instances of a reference signal; and
adjust, based on a gradient for at least two previously measured instances of the reference signal, a sampling rate associated with the reference signal.

30. The non-transitory computer-readable medium of claim 29, the computer executable code when executed by a processor further causes the processor to:
configure a first set of positive threshold rate-of-change values and a second set of negative threshold rate-of-change values; and
associate each interval between adjacent threshold rate of change values with a particular reference-signal-sampling rate,
wherein adjusting the sampling rate based on the gradient for the at least two previously measured instances of the reference signal comprises:
calculating the gradient for measurements over the time interval;
determining an interval containing the calculated gradient; and
configuring the sampling rate associated with the reference signal based on the particular reference-signal-sampling rate associated with the interval.

* * * * *